United States Patent
Christen et al.

(10) Patent No.: US 11,659,856 B2
(45) Date of Patent: May 30, 2023

(54) METHOD FOR CASTING AN ALKALOID MATERIAL INCLUDING CHANGING A HEIGHT OF A CASTING BLADE IN RESPONSE TO VARIATIONS IN SENSED MOVABLE SUPPORT HEIGHT

(71) Applicant: PHILIP MORRIS PRODUCTS S.A., Neuchatel (CH)

(72) Inventors: Pascal Christen, Neuchatel (CH); Francois Joset, Areuse (CH); Michel Borloz, Yvonand (CH); Lucien Suarez, Corcelles (CH); Yann Richard, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 311 days.

(21) Appl. No.: 16/614,413

(22) PCT Filed: May 18, 2018

(86) PCT No.: PCT/EP2018/063220
§ 371 (c)(1),
(2) Date: Nov. 18, 2019

(87) PCT Pub. No.: WO2018/211119
PCT Pub. Date: Nov. 22, 2018

(65) Prior Publication Data
US 2020/0178592 A1    Jun. 11, 2020

(30) Foreign Application Priority Data

May 19, 2017   (EP) ..................................... 17171980

(51) Int. Cl.
*A24B 3/14*    (2006.01)
*B29C 41/00*    (2006.01)
(Continued)

(52) U.S. Cl.
CPC .............. *A24B 3/14* (2013.01); *A24B 15/167* (2016.11); *A24C 5/39* (2013.01); *A24F 40/70* (2020.01);
(Continued)

(58) Field of Classification Search
None
See application file for complete search history.

(56) References Cited

U.S. PATENT DOCUMENTS

| | | | | |
|---|---|---|---|---|
| 5,697,385 | A | * 12/1997 | Seymour .................. | A24B 3/14 131/370 |
| 2007/0234582 | A1 | * 10/2007 | Kondo ............... | G01B 11/0691 33/501.04 |
| 2012/0292800 | A1 | * 11/2012 | Higuchi ................. | G01N 21/86 425/135 |

FOREIGN PATENT DOCUMENTS

| | | | |
|---|---|---|---|
| CN | 201999545 | A * | 10/2011 |
| CN | 202286283 | A * | 7/2012 |

(Continued)

OTHER PUBLICATIONS

KR 2007/0095224 A translation (Year: 2022).*
(Continued)

*Primary Examiner* — Joseph S Del Sole
*Assistant Examiner* — Guy F Mongelli
(74) *Attorney, Agent, or Firm* — Mueting Raasch Group (57) ABSTRACT

The invention relates to a method to cast a sheet (2) of a material containing alkaloids, the method comprising: Providing a container (6) having an aperture; providing a casting blade (9); Providing a movable support (3) running below the aperture of the container (6); Filling the container (6) with slurry (5); Casting the sheet (2) of tobacco material containing alkaloids material by means of the casting blade (9) onto the movable support (3); Sensing variations in a height of the movable support (3); and changing a height of
(Continued)

the casting blade (9) if such variations in the height of the movable support (3) are present.

14 Claims, 4 Drawing Sheets

(51) Int. Cl.
*B29C 41/28* (2006.01)
*A24C 5/39* (2006.01)
*A24B 15/167* (2020.01)
*A24F 40/70* (2020.01)
*B29K 1/00* (2006.01)

(52) U.S. Cl.
CPC ............ *B29C 41/003* (2013.01); *B29C 41/28* (2013.01); *B29K 2001/00* (2013.01); *B65H 2801/54* (2013.01)

(56) References Cited

FOREIGN PATENT DOCUMENTS

| | | | | |
|---|---|---|---|---|
| CN | 102648063 A | * | 8/2012 | ............ B21C 47/006 |
| KR | 2007/0095224 A | * | 9/2007 | ............ B21C 47/006 |
| WO | WO-2013087200 A1 | * | 6/2013 | ......... B29C 48/0018 |
| WO | WO 2016/050471 | | 4/2016 | |
| WO | WO 2016/096750 | | 6/2016 | |
| WO | WO 2016/096963 | | 6/2016 | |

OTHER PUBLICATIONS

CN-102648063-A translation (Year: 2022).*
CN 201999545 (Year: 2022).*
CN 202286283 (Year: 2022).*
PCT Search Report and Written Opinion for PCT/EP2018/063220 dated Jun. 28, 2018 (11 pages).

* cited by examiner

METHOD FOR CASTING AN ALKALOID MATERIAL INCLUDING CHANGING A HEIGHT OF A CASTING BLADE IN RESPONSE TO VARIATIONS IN SENSED MOVABLE SUPPORT HEIGHT

This application is a U.S. National Stage Application of International Application No. PCT/EP2018/063220 filed May 18, 2018, which was published in English on Nov. 22, 2018 as International Publication No. WO 2018/211119 A1. International Application No. PCT/EP2018/063220 claims priority to European Application No. 17171980.0 filed May 19, 2017.

The invention concerns a method to cast an alkaloid containing material.

Typically, aerosol-generating articles comprise a plurality of elements assembled in the form of a rod. The plurality of elements generally includes an aerosol-forming substrate and a filter element. One or both of the filter and the aerosol-forming substrate may comprise a plurality of channels to provide air-flow through the rod.

Today, in the manufacture of tobacco products, besides tobacco leaves, also homogenized tobacco material is used. This homogenized tobacco material is typically manufactured from parts of the tobacco plant that are less suited for the production of cut filler, like, for example, tobacco stems or tobacco dust. Typically, tobacco dust is created as a side product during the handling of the tobacco leaves during manufacture.

The most commonly used forms of homogenized tobacco material are reconstituted tobacco sheet and cast leaf. The process to form homogenized tobacco material sheets commonly comprises a step in which tobacco dust and a binder are mixed to form a slurry. The slurry is then used to create a tobacco web, for example by casting a viscous slurry onto a moving metal belt to produce so called cast leaf. Alternatively, a slurry with low viscosity and high water content can be used to create reconstituted tobacco in a process that resembles paper-making. Once prepared, homogenized tobacco webs may be cut in a similar fashion as whole leaf tobacco to produce tobacco cut filler suitable for cigarettes and other smoking articles. A process for making such homogenized tobacco is for example disclosed in European Patent EP 0565360.

In a "heat-not-burn" aerosol-generating article, an aerosol-forming substrate is heated to a relatively low temperature, in order to form an aerosol but prevent combustion of the tobacco material. Further, the tobacco present in the homogenized tobacco material is typically the only tobacco, or includes the majority of the tobacco, present in the homogenized tobacco material of such a "heat-not burn" aerosol-generating article. This means that the aerosol composition that is generated by such a "heat-not burn" aerosol-generating article is substantially only based on the homogenized tobacco material. Therefore, it is important to have good control over the composition of the homogenized tobacco material, for example for the control of the taste of the aerosol.

Due to variations in the physical properties of the slurry, for example, consistency, viscosity, fibre size, particle size, moisture or the age of the slurry, standard casting methods and apparatus may result in unintended variations in the application of the slurry onto a support during the casting of webs of homogenized tobacco. A less than optimal casting method and apparatus may lead to inhomogeneity and defects of the cast web of homogenized tobacco.

Inhomogeneity in the homogenized tobacco web may lead to difficulties in subsequent handling of the homogenized tobacco web in the production of the aerosol-generating article. For example, inhomogeneity may lead to tearing of the web or even rupture of the web during manufacture of the web of homogenised tobacco or further processing of the web of homogenised tobacco. This in turn could, for example, result in machine stops and the inadvertent creation of waste.

Additionally, an inhomogeneous tobacco web may create unintended difference in the aerosol delivery between aerosol generating articles that are produced from the same homogenized tobacco web.

Also, a non-optimal, a sub-optimal, or a varying thickness of the web could adversely influence the following production steps, such as a crimping step, and could deteriorate the release of substances from the crimped sheet of material to the air penetrating the rod, as well as adversely affect the RTD value.

The sheet of material may be cast using a casting knife whose blade is held in a vertical plane and with its cutting-edge held substantially horizontal. Further, the casting knife is arranged perpendicular to the moving direction of a movable support, typically in the form of a conveyor belt. The casting knife is held in place using poles, one on each side of the casting knife. The sheet of material is formed from a tobacco-containing slurry reservoir (sometimes referred to as a casting box) that has a strip-like aperture that is defined by the surface of the movable support and the casting knife. The thickness of the sheet of material is determined by the distance between the cutting edge of the blade and the surface of the moving movable support. The final thickness of the sheet of material may be different from the "initial thickness" due to the drying of the slurry into a solid-state sheet of material.

A problem in this context is that the exact position of the surface of the movable support, over which the slurry is spread, may vary. As an example, this could be due to a sagging of the movable support, in particular if the movable support is a conveyor belt. To avoid this, the slurry is typically spread onto the movable support in an area, where the movable support is supported by a supporting roller.

However, even then some variations in height can occur, due to a deformation of the movable support, due to a variation of the radius of the supporting roller (which is not unusual in reality, due to wear), due to a certain eccentricity of the supporting roller, or due to a combination of these and other effects.

Such variations pose a problem because even a slight change of about 20 microns or of about 30 microns in thickness of the cast sheet of material may have a noticeable effect on the experience of the end consumer. This is particularly true when considering the influence of the thickness of the cast web of material for the consecutive production steps towards a rod for an aerosol-generating article.

It would be desirable to provide a method for casting a sheet of homogenized tobacco material, preferably for an aerosol-generating article, that allows having a sheet of material of a more homogeneous thickness and thus an improved homogeneity of the aerosol-generating articles' properties which are directly or indirectly related to the thickness of the sheet of material.

According to a first aspect of the present invention, the invention relates to a method to cast a sheet of a material containing alkaloids material, the method comprising: providing a container having an aperture; providing a casting blade; providing a movable support running below the aperture of the container; filling the container with slurry; casting the sheet of material containing alkaloids by means of the casting blade onto the movable support; sensing variations in a height of the movable support; and changing a height of the casting blade if such variations in the height of the movable support are present.

Using this suggestion, the thickness of the sheet of material containing alkaloids may be more homogeneous. In particular, by sensing variations in the height of the movable support and consequently changing the height of the casting blade, for example of its tip, if such variations in the height of the movable support are present, the homogeneity of the thickness of the cast sheet of material containing alkaloids may be increased. Having a sheet of material containing alkaloids with a more uniform thickness, the following production steps like crimping and gathering may be made more precisely as well. Therefore, the experience for the consumer may be significantly more homogeneous (in particular, but not necessarily limited to, the RTD, the content of volatile compounds in the aerosol that will be inhaled, and the like).

As used herein, the term "sheet" denotes a laminar element having a width and length that is substantially greater than the thickness thereof.

As used herein, the term "sheet of homogenized tobacco material" denotes a thin layer of a homogenized tobacco material that is initially liquid-like, viscous or pasty and will become mechanically stable and self-supporting once it has sufficiently dried.

As used herein, the term "homogenized tobacco material" denotes material formed by agglomerating particulate tobacco. The homogenized tobacco material may have an aerosol-former content of greater than about 5 percent on a dry weight basis. The homogenized tobacco material may have an aerosol former content of between about 5 percent and about 50 percent preferably between about 15 and about 30 percent by weight on a dry weight basis. The sheet may contain tobacco or other plant-based material. Preferably, the plant-based material contains alkaloids. More preferably, the alkaloids include nicotine.

Homogenized tobacco material thus encompasses any tobacco material formed by the agglomeration of particles of tobacco material. Sheets or webs of homogenized tobacco are formed in the present invention by agglomerating particulate tobacco obtained by grinding or otherwise powdering for example tobacco leaf lamina or tobacco leaf stems or blends thereof.

In addition, homogenized tobacco material may comprise a minor quantity of one or more of tobacco dust, tobacco fines, and other particulate tobacco by-products formed during the treating, handling and shipping of tobacco.

Sheets of homogenized tobacco material may be formed by agglomerating particulate tobacco obtained by grinding or otherwise comminuting one or both of tobacco leaf lamina and tobacco leaf stems; alternatively, or in addition, sheets of homogenized tobacco material may comprise one or more of tobacco dust, tobacco fines and other particulate tobacco by-products formed during, for example, the treating, handling and shipping of tobacco. Sheets of homogenized tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenized tobacco material may comprise other additives including, but not limited to, tobacco and non-tobacco fibres, aerosol-formers, humectants, plasticisers, flavourants, fillers, aqueous and non-aqueous solvents and combinations thereof.

As used herein, the term "container" denotes an arbitrarily formed storage, preferably intermediate storage and supply of liquid-like or pasty substances, such as the slurry, in particular towards an aperture. The container may or may not include any conveying devices for conveying the substances that are contained in the container towards the aperture.

As used herein, the term "aperture" denotes any type of a single or a plurality of openings that are provided for the passage of a liquid-like, viscous or pasty substance, such as the slurry. The aperture may have a rectangular shape of a comparatively long length and a comparatively small height.

As used herein, the term "casting blade" denotes a longitudinally shaped element that may have an essentially constant cross-section along major parts of its lengthwise extension. It shows at least one preferably straight edge that is intended to come into contact with a pasty, viscous or liquid-like substance to be influenced by said edge, such as a slurry. Said edge may have a sharp and knife-like edge. Alternatively it may have a rectangular or a rounded edge.

As used herein, the term "movable support" denotes any means comprising a surface that can be moved in at least one longitudinal direction. The movable support may form a closed loop so to provide an uninterrupted transporting ability in one direction. However, the movable support may be moved in back and forth moving way as well. The movable support may include a conveyor belt. The movable support may be essentially flat and may show a structured or an unstructured surface. The movable support may show no openings in its surface or may show only orifices of such a size that they are impenetrable for the slurry the conveyor belt is to be used with. The movable support may comprise a sheet-like movable and bendable band. The band may be made of a metallic material, including but not limited to steel, copper, iron alloys and copper alloys, or a rubber material. The band may be made of a temperature-resistant material so that it can be heated to speed up the drying process of the slurry.

As used herein, the term "reference horizontal plane" denotes a plane that is arranged horizontally and that is used as a reference. It may be identical to a plane that is actually present or may be purely fictional.

As used herein, the term "horizontal plane" may relate to a plane that is at least essentially parallel to a plane that is defined by the main chassis of the apparatus for casting a sheet of material, the various parts are used in (wherein the respective plane, defined by the main chassis resembles at least somewhat a horizontal plane with respect to earth's surface). Alternatively it may be a plane that is essentially parallel to a plane that is horizontal with respect to earth's surface. Both definitions may relate to an intended alignment of the apparatus, in which the apparatus is intended to be operated on a normal base.

As used herein, the term "height with respect to a reference plane" denotes a distance of a further defined part of the respective device with respect to the reference plane in a direction that is normal to the reference plane.

As used herein, the term "tip of the casting blade" denotes the edge of the casting blade that forms a part of the bordering circumference of the casting aperture.

Usually it is arranged at the lower side of the casting blade or at the upper side of the aperture.

As used herein, the term "portion of the movable support located below the tip" denotes the imaginary line where smallest distance between the tip of the casting blade and the surface of the movable support occurs.

As used herein, the term "slurry" denotes a liquid-like, viscous or pasty material that may comprise an emulsion of different liquid-like, viscous or pasty material and that may contain a certain amount of solid-state particles, provided that the slurry still shows a liquid-like, viscous or pasty behaviour, at least in the vicinity of the aperture.

As used herein, the term "sensing variations in the height" denotes any type of sensing, including, but not limited to direct or indirect mechanical contact, sensing using sensor means, sensing by reflection effects, may it be sound reflection, ultra-sound reflection, light reflection or radio-wave reflection, and inductive effects.

Sensing variations may include sensing an absolute value and sensing a relative change.

As used herein, the term "changing the height" denotes any variation of the height, including, but not limited to, direct or indirect mechanical transmission, transmission using sensor devices and actuating devices, and processing of input signals by a preferably programmable electronic controller. The changing of the height may be done immediately, with a time delay or with a look-ahead algorithm based on the sensing signals.

An "alkaloids containing material" or "a material containing alkaloids" are equivalent wording and refer to a material which contains one or more alkaloids. Among alkaloids, nicotine is a preferred one, which can be found in tobacco. Alkaloids are a group of naturally occurring chemical compounds that mostly contain basic nitrogen atoms. This group also includes some related compounds with neutral and even weakly acidic properties. Some synthetic compounds of similar structure are also termed alkaloids. In addition to carbon, hydrogen and nitrogen, alkaloids may also contain oxygen, sulfur and, more rarely, other elements such as chlorine, bromine, and phosphorus.

Alkaloids are produced by a large variety of organisms including bacteria, fungi, plants, and animals. They can be purified from crude extracts of these organisms by acid-base extraction. Caffeine, nicotine, theobromine, atropine, tubocurarine are examples of alkaloids.

An homogenized tobacco sheet is an alkaloid containing sheet.

Alkaloid containing materials, such as homogenized tobacco materials, are formed by mixing several ingredients with water to obtain a slurry. In a further step, a continuous web of homogenized material is created on a support by casting the slurry onto the support. It is desired that the resulting homogenized tobacco material has a relatively high tensile strength and a good homogeneity.

An important parameter of the slurry which is used to realize the homogenized tobacco material and which influences the tensile strength and homogeneity of the cast web is its viscosity to form the continuous web of homogenized tobacco material, in particular at the time of casting of the slurry. In addition, also the density of the slurry is important for determining the end quality of the cast web, in particular before casting. A proper slurry density, viscosity and homogeneity minimize the number of defects and maximize tensile strength of the cast web.

The slurry comprises a number of different components or ingredients. These components influence the alkaloid containing material, such as the homogenized tobacco material properties. A first ingredient is a alkaloid containing powder blend, such as a tobacco blend, which preferably contains the majority of the alkaloids present in the slurry. In a preferred embodiment, the alkaloid containing material is tobacco. The tobacco powder blend is the source of the majority of tobacco in the homogenized tobacco material and thus gives the flavor to the final product, for example to an aerosol produced heating the homogenized tobacco material. A cellulose pulp containing cellulose fibers is preferably added to the slurry in order to increase the tensile strength of the tobacco material web, acting as a strengthening agent. A binder and an aerosol-former are preferably added as well, in order to enhance the tensile properties of the homogenized sheet and promote the formation of aerosol. Further, in order to reach a certain viscosity and moisture optimal for casting the web of homogenized tobacco material, water may be added to the slurry. The slurry is mixed in order to render the slurry as homogeneous as possible.

Preferably, the slurry includes a binder in an amount between about 1 percent and about 5 percent in dry weight basis of the alkaloid containing material. It is advantageous to add a binder to the slurry, such as any of the gums or pectins described herein, to ensure that the alkaloid containing material, if in powder, remains substantially dispersed throughout the homogenized tobacco web. For a descriptive review of gums, see Gums And Stabilizers For The Food Industry, IRL Press (G. O. Phillip et al. eds. 1988); Whistler, Industrial Gums: Polysaccharides And Their Derivatives, Academic Press (2d ed. 1973); and Lawrence, Natural Gums For Edible Purposes, Noyes Data Corp. (1976).

Although any binder may be employed, preferred binders are natural pectins, such as fruit, citrus or tobacco pectins; guar gums, such as hydroxyethyl guar and hydroxypropyl guar; locust bean gums, such as hydroxyethyl and hydroxypropyl locust bean gum; alginate; starches, such as modified or derivitized starches; celluloses, such as methyl, ethyl, ethylhydroxymethyl and carboxymethyl cellulose; tamarind gum; dextran; pullalon; konjac flour; xanthan gum and the like. The particularly preferred binder for use in the present invention is guar.

Advantageously, the slurry further includes an a aerosol-former in an amount comprised between about 5 percent and about 60 percent in dry weight of the slurry, more preferably between about 5 percent and about 30 percent.

Suitable aerosol-formers for inclusion in slurry for webs of alkaloid containing material are known in the art and include, but are not limited to: monohydric alcohols like menthol, polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate.

Preferably, the slurry contains a cellulose pulp in an amount between about 1 percent and about 6 percent, typically between about 1 percent and about 3 percent in dry weight basis of said slurry.

A cellulose pulp includes water and cellulose fibres. Cellulose fibres for including in a slurry for homogenized tobacco material are known in the art and include, but are not limited to: soft-wood fibres, hard wood fibers, jute fibres, flax fibres, tobacco fibres and combination thereof. In addition to pulping, the cellulose fibres might be subjected to suitable processes such as refining, mechanical pulping, chemical pulping, bleaching, sulphate pulping and combination thereof.

The slurry is then collected in container, also called casting box, in which a pre-defined amount of slurry is preferably maintained, for example a pre-determined filling level of slurry within the casting box is set. Preferably, slurry is continuously supplied to the casting box while the slurry is cast onto a movable support to form a continuous web of homogenized tobacco material.

The slurry fills the casting box up to a preferably predetermined level. Preferably, the filling level of slurry in the casting box is maintained substantially constant within the casting box. The slurry flows out the casting box from an aperture realized in the bottom of the casting box, for example under the influence of by gravity. Additionally, means for an active transport within the casting box may be provided, like pushers or propellers. Preferably, the casting box forms a pressurized enclosure. Preferably, control means are provided that allow control over the pressure within the casting box. In such an embodiment, the flow of slurry out of the casting box is additionally controlled by setting and maintaining the level of the internal pressure within the casting box. Preferably, the casting apparatus comprises a mixing device to mix the slurry inside the casting box. The slurry is then distributed onto the movable support through the gap that is formed between the casting blade and the moving support.

According to the invention, the slurry is cast across a width of a moving support, for example through an exit of the casting box that is formed between the moving support and a casting blade.

Preferably, the moisture of said slurry at casting is between about 40 percent and about 95 percent, more preferably between about 60 percent and about 80 percent of the total weight of slurry at casting.

Preferably, the method for production of an alkaloid containing material comprises the step of drying said cast web, winding said cast web, wherein the moisture of said cast web at winding is between about 6 percent and about 15 percent of the total weight. Preferably, the moisture of said cast sheet at winding is between about 8 percent and about 12 percent of the total weight.

The support moves along a longitudinal direction in order to remove the slurry from the casting box. The support may include for example a stainless steel movable belt. The casting blade is used in order to form a cast web of slurry which has a substantially uniform thickness onto the movable support. Further, the distance or gap between the blade and the support may determine, among others, the thickness of the cast web of slurry.

The casting blade may be connected to the casting box, for example fixed to the casting box so that the casting box and the casting blade moves together, or they may be two independent objects. The casting box could be fixed, while the casting blade could move with respect to the movable support.

The thickness of the web of alkaloids containing material which is cast onto the movable belt has a preferred value which is as uniform as possible across the width of the cast web in order to obtain a final product within the required specifications.

In order to achieve such homogeneous thickness, according to the invention, variations in the height of the movable support are checked. These movements in height are counter-balanced by movements of the casting blade. The gap between the casting blade and the support is thus preferably kept constant so that the thickness of the sheet is kept constant. Therefore, irregularities in the movable support can be compensated.

The height of the casting box may also be changed if such variations in the height of the movable support are present. For example, this may take place is the casting box and the casting blade are fixed one to the other.

The height of the casting box and the height of the casting blade may be both changed if such variations in the height of the movable support are present.

Further, a cast web having a constant thickness is also relevant in the drying process. After the casting, the web of alkaloids containing material is dried and the drying parameters depend, among others, on the thickness of the web. If the cast web includes thickness variations, changes in the moisture content may appear in finished product, and this may require at least partial rejection of the end product.

After the slurry has been cast so that a sheet of alkaloid containing material has been formed, the sheet thickness may preferably vary between about 40 micron and about 1000 micron, preferably between about 85 micron and about 500 micron, more preferably between about 180 micron and about 250 micron.

The invention thus allows keeping the thickness of the sheet constant changing the height of the blade if a corresponding change in height of the movable support is detected. This can be achieved for example by means of a "floating knife" as a blade, where the blade "changes its height" following the height changes of the medium to which it is in contact.

Preferably, the method includes: selecting a height of the casting blade with respect to a reference plane; and selecting a height of a portion of the movable support located below the casting blade with respect to the reference plane. In order to properly detect changes in height of the support, a reference plane is selected. This plane could be for example a horizontal plane, due to the fact that preferably the movable support defines a horizontal surface on which it transports the cast sheet. Taking measurements of height with respect to the reference plane allows to obtain a proper measurement each time variations of such a height needs to be detected because the reference lane is "fixed" and does not move.

Preferably, the casting blade includes a tip and wherein sensing a height of the casting blade or selecting a height of the casting blade includes sensing a height of a tip of the casting blade or selecting a height of the tip of the casting blade.

The thickness of the sheet of homogenized tobacco material is defined by a gap between the tip of the blade, which is the lowermost edge of the blade, and the support. This gap therefore is preferably kept substantially constant in order to obtain a constant thickness of the sheet of homogenized tobacco material.

Preferably, the method is done in a way that sensing the variations in the height of the movable support includes positioning a sensing surface in contact to the movable support. The sensing surface may be a planar surface, a roller element, a ball-like or tip-like sensor element or the like. The contact of the sensing surface with its corresponding surface of the movable support may be established with or without a lubricating means, in particular a lubricant, like a lubricating liquid. Using this proposal, the method may be employed particularly simple and in a cost efficient way. Due to the low complexity of the proposal, the method may be employed particularly reliable. In particular, the sensing surface may be arranged at a lateral side of the cast sheet, of the movable support, in the vicinity of the aperture, or a combination of two or all thereof.

As used herein, the term "lateral side" denotes a positioning near a limiting side of the respective device in a direction that is essentially perpendicular to the moving direction of the movable support during normal operating conditions, where the moving direction may be defined to be in the vicinity of that part of the support where the slurry is cast onto the moving support.

Even more preferred, the method can be employed in a way that it includes positioning two sensing surfaces on the movable support at two opposite lateral sides of the cast sheet. This way locally defined artefacts that may be around for whatever reason may be averaged out to a certain extent, so that an adverse effect on the cast sheet may be reduced. Such artefacts may be a local indentation (something like a pothole) or some dirt that may be present on a certain surface area. Using this proposal, the homogeneity in thickness of the cast sheet can be further enhanced in a simple way and possibly using solely mechanical means.

The casting blade has preferably a dominant dimension, which is its width, and it preferably extends along substantially the whole width of the casting box.

Preferably, the width of the blade and the width of the casting box to which the blade is attached are similar. At the two ends of the width of the casting blade, the first and second sensing surfaces are disposed. According to the invention, the first and second sensing surface are coupled to the casting blade itself, for example by means of fastening devices. The coupling between the casting box and the casting blade is such that the casting blade is movable with respect to the casting box.

The sensing surfaces sense changes in height of the movable support and force the casting blade to change its height as well. The change in the height of the blade is therefore performed changing the spatial positioning, that is the position in the tridimensional space, of the casting blade by means for example of actuators connecting the sensing surfaces to the blade.

The sensing surfaces may be positioned on contact devices adapted to be in contact with the movable support.

In case of different height variations of the sensing surfaces, it is possible for example to calculate a mean of the height variations of the two sensing surfaces, and to adjust the casting knife height accordingly.

According to embodiments, different kinds of sensor could be used to determine the height variation of the casting knife according to the data generated by the contact devices.

Preferably, the method is employed in a way that the method includes the features: translating the movable support below the aperture by means of a roller; positioning the container on a top portion of the roller. The roller may be the only actuated one or one of several actuated rollers. This way, a translational movement of the movable support may be easily achieved by rotating the roller around its rotational axis. Usually, the roller will have a comparatively large size so that the curvature of its surface—and therefore the curvature of the movable support—will be comparatively low and can be locally approximated by a plane in the vicinity of the aperture. A typical range of radii for the roller may be between about 10 centimetres and about 1 meter, preferably between about 15 centimetres and about 90 centimetres, preferably between about 20 centimetres and about 80 centimetres, preferably between about 25 centimetres and about 60 centimetres.

The roller may be an end side roller of the movable support or may be an intermediary roller of the movable support. This statement may be particularly valid in case the movable support is designed in form of some kind of a conveyor belt. By positioning the container on a top portion of the roller, the casting process may be gravity-assisted and thus may be very simple and effective. In particular, a conveying means for conveying the slurry out of the container through the aperture may or may not be used.

As used herein, the term "top portion of the roller" denotes a section of the presently upper circumferential portion of the roller, being opposite a floor where an apparatus to cast the sheet of alkaloids containing material is located.

Considering a rotational axis of the roller as a center, a vertical radius defines the 0°, which is the topmost point of the roller. The top portion of the roller is thus a symmetrical section centered at this vertical radius. The top portion of the roller is thus a section which starts from a location defined by radius forming an angle of about 1°, 2°, 3°, 4°, 5°, 10°, 15°, 20°, 25°, 30°, 35°, 40° or 45° with the vertical radius on the left of the same and may end about at or about 1°, 2°, 3°, 4°, 5°, 10°, 15°, 20°, 25°, 30°, 35°, 40° or 45° on the right of the topmost point.

Preferably, the method is employed in a way that the casting blade is provided adjacent to the container, including providing the casting blade with a tip forming an angle comprised between about 5° and about 10° with the topmost point of the roller. Thus the tip of the casting blade forms an angle with the topmost point of the roller comprised between about 5° and about 10°. This angle is the angle formed between the vertical radius above defined and a radius of the roller touching the tip of the blade. This way an even more homogeneous sheet of alkaloids containing material may be realised by means of the influence of gravity.

In particular, it is possible that some kind of a "local sump" may be formed between the aperture and the movable support, so that the arrangement is less vulnerable to speed changes of the movable support. Possibly even a short stop may not cause a spilling of slurry on the floor, as an example. This way, a particularly process save arrangement can be realised.

It is further suggested is to employ the methods in a way that changing the height of the tip of the casting blade includes: sending signals relative to variations in height of the movable support to a motor; and raising or lowering the tip of the casting blade by means of the motor according to the received signals. The signals that may be used for sending signals relative to variations in height of the movable support may come from appropriate sensors and may or may not be processed by a controller. The controller may an electronic controller and may be programmable.

The motor may be of a standard type, of a servo type, of a stepper type, of a linear type or the like and may or may not use a gear for transmitting the movement from the motor to the casting blade. In particular, in case of a motor providing a rotational movement, a worm gear drive may be used. Using this design, the width of the aperture and therefore the thickness of the cast sheet of alkaloids containing material may be set very precisely. One may even influence the width of the aperture using additional signals apart from the height of a portion of the conveyor belt located below the tip of the casting blade. In particular, some kind of a loopback influence may be realised.

Preferably the method is employed in a way that the method includes the steps of: delaying the step of changing the height of the tip of the casting blade with respect to the step of sensing variations in height of the movable support. This way, the movement speed of the conveyor belt may be taken into account, so that even in case that the point where the sensing of the height of the conveyor belt is made lies ahead of the point where the tip of the casting blade is arranged, the movement of the casting blade may be done at the correct time. This way a particularly homogeneous thickness of the cast sheet of alkaloids containing material may be realised.

It is further preferred to employ the method in a way that positioning a sensing surface in contact to the movable support includes positioning a sensing surface downstream the casting blade in the direction of motion of the movable support.

This way, the mechanical arrangement of the various components may be particularly simple. Furthermore, using this method, variations in height of the conveyor belt that are not limited to a small section of the conveyor belt may be countered by appropriately adjusting the height of the tip of the casting blade.

Furthermore, one has to consider that the movable support is usually arranged in form of a closed band so that a certain distortion of the height of the movable support will usually show up repetitively. Therefore, even if the sensing surface is positioned downstream of the casting blade, even small irregularities of the movable support may be correctly addressed by an appropriate positioning of the casting blade when an appropriately long delay time is chosen. This may apply in analogy, when using a movable support that is moving back and forth.

Further preferred, the method can be performed in a way that positioning a sensing support downstream the casting blade includes positioning the sensing surface at an angle comprised between about 15° and about 30° with a top most point of the roller. This way, the mechanical arrangement may be particularly simple.

Preferably, the method is employed in a way that the method includes the step of exerting a force by the sensing surface onto the movable support. Using this modification, a tight contact between the sensing surface and the movable support may be ensured. The force is preferably not chosen to be so strong that erroneous measurements will result, for example by indenting the movable surface.

Furthermore, the force that is supplied is preferably not too excessive because otherwise an increased wear may result.

It is further preferred to employ the method in a way that includes the step of: varying the value of the force depending on the desired sensitivity. This way, several possibly contradicting effects may be taken into account. This may be done in a way that the force is chosen away that effects that are particularly undesired for the current process may be avoided.

Another preferred way on how to employ the method includes the step of: drying the cast sheet. This drying may be performed while the slurry/the cast sheet of alkaloids containing material still rests on the conveyor belt, which may act as a supporting support. The drying may be done by applying an air stream, where the air stream may be at an elevated temperature. Furthermore, the drying may be done at least in part by heating appropriate parts of the movable support.

Preferably, the conveyor belt may be chosen to comprise a temperature resistant material.

Another preferred way to employ the method includes the step of: rolling the cast sheet into a bobbin. This way the produced sheet of alkaloids containing material may be stored before it is actually needed. Furthermore, the sheet of alkaloids containing material may be easily transported to another production machine or even another production facility if it is rolled into a bobbin.

The thus produced sheet of alkaloids containing material may be used for an aerosol-forming substrate that may be used later on for use in an aerosol generating device.

The aerosol-forming substrate may be a solid aerosol-forming substrate that may be based on a sheet of alkaloids containing material. Alternatively, the aerosol-forming substrate may comprise both solid and liquid components, where at least part of the solid components may be based on a sheet of alkaloids containing material. The aerosol-forming substrate may comprise a tobacco-containing material containing volatile tobacco flavour compounds, which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol. If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco. The solid aerosol-forming substrate may be in loose form, or may be provided in a suitable container or cartridge. For example, the aerosol-forming material of the solid aerosol-forming substrate may be contained within a paper or other wrapper and have the form of a plug. Where an aerosol-forming substrate is in the form of a plug, the entire plug including any wrapper is considered to be the aerosol-forming substrate.

The aerosol-forming substrate may be formed from or may comprise a alkaloids containing material having an aerosol former content of greater than about 5 percent on a dry weight basis and water. The alkaloids containing material may be based on a cast sheet of alkaloids containing material. For example, the alkaloid containing material may have an aerosol former content of between about 5 percent and about 30 percent by weight on a dry weight basis. An aerosol generated from such aerosol-forming substrates may be perceived by a user to have a particularly high temperature and the use of a high surface area, low resistance to draw aerosol-cooling element may reduce the perceived temperature of the aerosol to an acceptable level for the user.

An aerosol-generating article may be a heated aerosol-generating article, which is an aerosol-generating article comprising an aerosol-forming substrate that is intended to be heated rather than combusted in order to release volatile compounds that can form an aerosol. A heated aerosol-generating article may comprise an on-board heating means forming part of the aerosol-generating article, or may be configured to interact with an external heater forming part of a separate aerosol-generating device.

As used herein, the term "aerosol-generating article component" includes the part of an aerosol-generating article that releases the major amount of volatile compounds in an aerosol-generating article.

This way, an aerosol-generating article that suits the present-day market needs may be realised in an efficient and cheap way. In particular, an aerosol-generating article may be realised that resembles a traditional combustion-type aerosol-generating product, in particular a traditional cigarette. The "gathering" may particularly mean that a web or sheet is convoluted, or otherwise compressed or constricted substantially transversely to the cylindrical axis of a rod that will be produced by gathering the sheet of material.

Such an aerosol-generating article may resemble a combustible smoking article, such as a cigarette. An aerosol-generating article may comprise tobacco. An aerosol-generating article may be disposable. An aerosol-generating article may alternatively be partially-reusable and comprise a replenishable or replaceable aerosol-forming substrate.

Optionally, the solid aerosol-forming substrate may contain additional tobacco or non-tobacco volatile flavour compounds, to be released upon heating of the solid aerosol-forming substrate. The solid aerosol-forming substrate may also contain capsules that, for example, include the additional tobacco or non-tobacco volatile flavour compounds and such capsules may melt during heating of the solid aerosol-forming substrate.

The elements of the aerosol-generating article may be assembled by means of a suitable wrapper, for example a cigarette paper. A cigarette paper may be any suitable material for wrapping components of an aerosol-generating article in the form of a rod. Preferably, the cigarette paper holds and aligns the component elements of the aerosol-generating article when the article is assembled and holds them in position within the rod. Suitable materials are well known in the art.

The aerosol-generating article may be substantially cylindrical in shape. The aerosol-generating article may be substantially elongate. The aerosol-generating article may have a length and a circumference substantially perpendicular to the length. The aerosol-forming substrate may be substantially cylindrical in shape.

The aerosol-forming substrate may be substantially elongate. The aerosol-forming substrate may also have a length and a circumference substantially perpendicular to the length. The aerosol-forming substrate may be received in the aerosol-generating device such that the length of the aerosol-forming substrate is substantially parallel to the airflow direction in the aerosol-generating device. The aerosol-cooling element may be substantially elongate.

The aerosol-generating article may have a total length between approximately about 30 millimetres and approximately about 100 millimetres. The aerosol-generating article may have an external diameter between approximately about 5 millimetres and approximately about 12 millimetres.

The aerosol-generating article may comprise a filter or mouthpiece. The filter may be located at the downstream end of the aerosol-generating article. The filter may be a cellulose acetate filter plug. The filter may be approximately about 7 millimetres in length in one embodiment, but may have a length of between approximately about 5 millimetres and approximately about 10 millimetres. The aerosol-generating article may comprise a spacer element located downstream of the aerosol-forming substrate.

Further advantages of the invention will become apparent from the detailed description thereof with non-limiting reference to the appended drawings.

Figure 1:
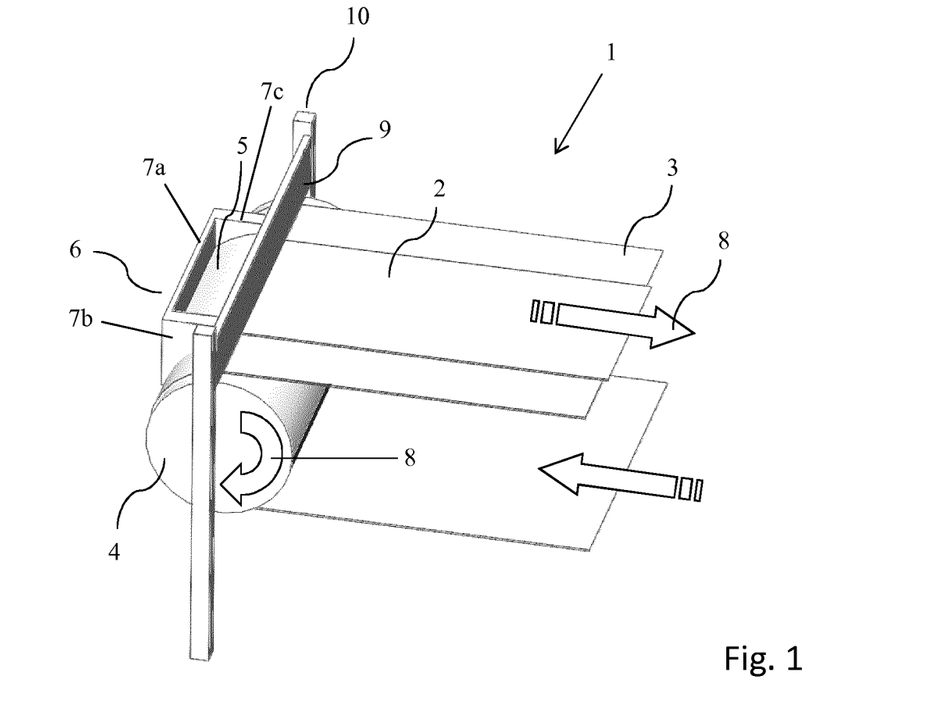
FIG. 1 shows the basic principle of how to cast a sheet of alkaloids containing material according to the state of the art in a schematic perspective view.

In FIG. 1 a casting apparatus 1 for casting sheets 2 of alkaloids containing material from a slurry 5 as presently used in the state of the art is shown in a partial, schematic perspective view. Preferably, sheet 2 is a homogenized tobacco sheet.

Casting apparatus 1 includes a movable support 3, one or more rollers 4, a casting box 6 adapted to contain slurry 5 and a casting blade 9.

Using the casting apparatus 1, a thin sheet 2 of alkaloids containing material is cast on the flexible, thin movable metal support 3 that is presently made out of a thin band of steel. The band of steel 3 is closed to form a loop, so that the thin band of steel 3 forms a structure that is similar to a conveyor belt.

It is noted that in FIG. 1 only a part of the complete casting apparatus 1 is shown, namely the part where the casting of the sheet 2 of alkaloids containing material is done. The conveyor belt 3 may show a significant length so that the sheet 2 of alkaloids containing material that is initially present on conveyor belt 3 in a viscous or pasty form has sufficient time to dry so that it can become mechanically stable and can be pulled off the conveyor belt 3. When being pulled off the conveyor belt 3, the sheet 2 of alkaloids containing material has to be mechanically self-sustaining. The thus created sheet 2 of alkaloids containing material can be wound up onto a bobbin that can be easily stored or that can be transported to other production machine or even another production facility.

The conveyor belt 3 is supported at both ends (only one is shown in FIG. 1) by rollers 4 that typically show a radius of about 30 centimetres. However, different sizes are possible as well. In FIG. 1, only the left roller 4 is visible, where roller 4 is an actively driven roller, so that roller 4 is able to move the conveyor belt 3 together with the deposited sheet 2 of alkaloids containing material on top.

Although not shown in FIG. 1, some intermediary supporting rollers that are typically of a smaller size may be used, so that a somewhat horizontal plane can be realized for the upper surface of conveyor belt 3, even if the conveyor belt 3 has a significant length. The roller at the other end may be either actively driven or passively driven. The intermediary supporting rollers (not shown) are usually not actively driven, although it is possible that at least some of those supporting rollers are actively.

Furthermore, it is possible to provide the casting apparatus 1 with heating devices (not shown) so that the cast sheet 2 of alkaloids containing material dries faster.

This can be done by electrical heating elements or some gas flames that heat up appropriate areas of the conveyor belt 3 and therefore the sheet 2 of alkaloids containing material that is cast on top of the conveyor belt 3.

The cast sheet 2 of alkaloids containing material is produced out of a slurry 5 that is a viscous or pasty mixture of particles, essentially made of finely ground tobacco material, where the particles are brought into a viscous or pasty form by mixing it with a solvent. As an example, water can be used as a solvent. Of course, additional solids compounds, additional liquid, viscous or pasty compounds or both can be part of the slurry 5 as well.

The slurry 5 is contained in a casting box 6. The casting box 6 is open on the top, so that slurry 5 can be replenished. Towards the roller 4, or to be more exact: towards the conveyor belt 3 that is placed on top of the roller 4 in the vicinity of casting box 6, the casting box 6 is open as well, so that the slurry 5 will come in area-measured contact with the upper surface of conveyor belt 3. At three 7a, 7b, 7c of the four sides of casting box 6, the sidewalls 7a, 7b, 7c of the casting box 6 form a narrow gap with the corresponding surface part of the conveyor belt 3. In FIG. 1, this is the case for the proximal sidewall 7a that is arranged at the frontal side when seen in the moving direction 8 of conveyor belt 3. Furthermore, it is the case for the sideward sidewalls 7b, 7c. These walls 7a, 7b, 7c form a thin gap between their lower ends and the conveyor belt 3.

At the fourth side of the casting box 6, an aperture is formed between the cutting edge 13 of a casting blade 9 and the conveyor belt 3. The aperture is of a rectangular shape and determines the cross-sectional shape of the sheet 2 of alkaloids containing material. Also, the thickness of the sheet 2 of alkaloids containing material is determined by the height of the aperture that is formed by the casting blade 9 and the conveyor belt 3. This relates to the "initial" thickness of the sheet 2 of alkaloids containing material, since the thickness may change due to a drying process. Typically, a shrinkage of the sheet 2 of alkaloids containing material occurs, for example during drying.

A size of the aperture formed by the cutting edge 13 of the casting blade 9 and the upper surface of the conveyor belt 3 has to remain constant to obtain a sheet 2 of alkaloids containing material with constant thickness.

However, a constant height of the casting blade 9 does not guarantee such a homogeneous thickness of the cast sheet 2 of tobacco material. This is, because the roller 4 may show some flat areas. This can easily occur with time due to wear of the casting apparatus 1. On the contrary, some dirt that is present on the roller 4 (or on the lower side of the conveyor belt 3) may lead to a small bump, decreasing the thickness of the sheet 2 of alkaloids containing material.

Furthermore, the conveyor belt 3 might show some protrusions or recesses after some time as well, in particular due to wear. Then, the fixed height of the casting blade 9 will mean that the size of the aperture will vary, and consequently, the thickness of the cast sheet 2 of alkaloids containing material will not be homogeneous. It has to be noted that small variations in thickness of the cast sheet 2 of tobacco material may already cause noticeable variations in the smoking experience for the end consumer, even if the variation is only in the order of some 20 µm to 30 µm. Such small variations, however, are not unlikely to occur.

Figure 2:
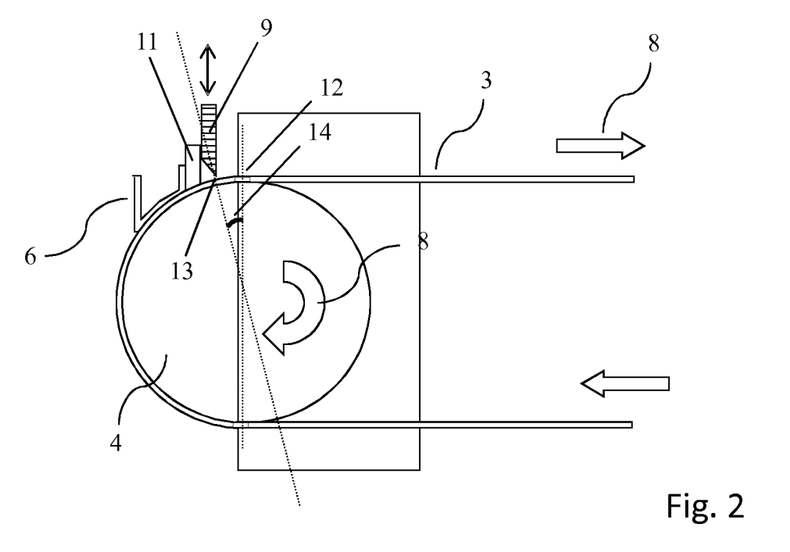
FIG. 2 is a first embodiment of how to produce a cast sheet of alkaloids containing material with homogeneous thickness in a schematic view from the side.

Therefore, in FIG. 2 a method for producing a cast sheet 2 of alkaloids containing material is proposed which will be further explained with reference to FIG. 2. For the sake of clarity, the slurry 5 and the cast sheet 2 of alkaloids containing material are not shown in FIG. 2 (neither in FIGS. 3 and 4).

Seen in the moving direction 8 of the roller 4 and the conveyor belt 3, the casting box 6 and the casting blade 9 are arranged prior to the topmost point 12 of roller 4 and are arranged neighbouring each other. More exactly, the cutting edge 13 of casting blade 9 is arranged at an angle 14 of about 24° to 25° before the top most point 12 of roller 4—and therefore of the highest point of conveyor belt 3 as well (at least in the proximity of roller 4).

As can be further seen, contact elements 11 are placed on the windward side of casting blade 9 and on the leeward side of casting box 6. The contact elements 11 are attached both to the casting box 6 and to the casting blade 9. The contact elements 11 are presently made of a plastic material that has a comparatively low friction in contact with the moving conveyor belt 3. In detail, even a slight lubrication effect can be realized by a suitable choice for the material of contact elements 11. The lower surface of the contact elements 11 is formed in a way that corresponds to the local curvature of the conveyor belt 3, the contact element 11 is in contact with. Therefore, the lower surface of the contact elements 11 is slightly concave (corresponding to the slightly convex shape of the conveyor belt 3, which again corresponds to the curvature of roller 4).

In case the conveyor belt 3 has a locally smaller or larger thickness, or in case the roller 4 has a protrusion or a recess on its outer circumferential surface, the contacting element 11 will move up and down together with the current outer surface of the conveyor belt 3 thanks to contact elements 11 being in gliding contact with the surface of the conveyor belt 3. Therefore, casting blade 9 moves along with the contacting elements 11 with respect to height and therefore follows any inhomogeneities of the surface of conveyor belt 3. Therefore, a more homogeneous thickness of the casted sheet 2 of alkaloids containing material can be realized. Local deviations of the outer circumferential surface of conveyor belt 3 can thus be compensated in the vicinity of the casting arrangement.

Presently, one contact element 11 is placed on both sides of the cast sheet 2 of alkaloids containing material. The contact elements 11 are still within the region of conveyor belt 3, so that they contact the surface of the conveyor belt.

Figure 3:
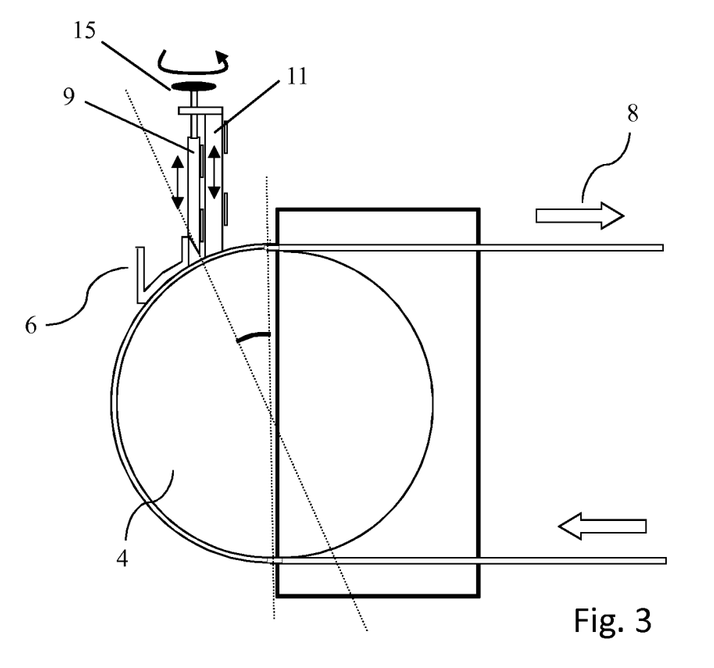
FIG. 3 is a second embodiment of how to produce a cast sheet of alkaloids containing material with homogeneous thickness in a schematic view from the side.

In FIG. 3, another possible embodiment of how to cast a sheet 2 of alkaloids containing material with a more homogeneous thickness is depicted. Essentially, the casting process is quite similar to the embodiment as shown in FIG. 2. However, in the present example, the contact elements 11 are arranged on the leeward side of the moving direction 8 of conveyor belt 3 and roller 4. The casting blade 9 is not directly attached to the contact elements 11. Instead, adjustment screws 15 are employed, so that the height of the casting blade 9 can be raised or lowered with respect to the position of the contact elements 11. Therefore, the height of the aperture and therefore the thickness of the cast sheet 2 of alkaloids containing material can be varied, in particular from one batch to another.

In all embodiments, the contacting elements 11 and therefore the casting blade 9 moves up and down along with any variations of the outer circumferential surface of conveyor belt 3. Therefore, the casting apparatus 1 will allow the production of a cast sheet 2 of alkaloids containing material with a more homogeneous thickness.

Figure 4:
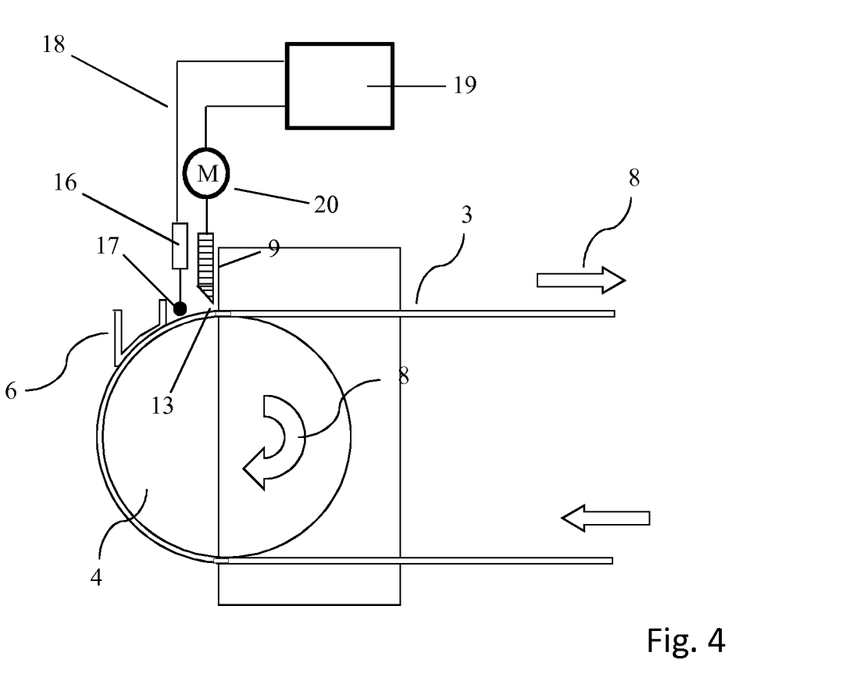
FIG. 4 is a third embodiment of how to produce a cast sheet of alkaloids containing material in a schematic view from the side.

In FIG. 4, another modification of the casting apparatus 1 is shown.

Here, instead of contact elements 11 that work purely mechanically, two position sensors 16 are used. The contacting tip 17 of the position sensors 16 will measure the current position of the outer circumferential surface of conveyor belt 3 that is in contact with the contacting tip 17. In particular, any variations from the nominal position are registered by the position sensors 16 and are sent via cables 18 to a controller 19. The controller 19 inputs the sensor data and generates a control signal that is sent to a stepper motor 20 via another cable 18. Using the stepper motor 20, the height of the casting blade 9 is raised a lowered appropriately, so that an aperture with a constant size can be realized (despite of any fluctuations of the height of the outer surface of conveyor belt 3). Thus, a cast sheet 2 of alkaloids containing material can be produced that shows a more homogeneous thickness.

The controller 19 can be set up in a way to introduce a time delay $\Delta t$ between the repositioning of the casting blade 9 by stepper motor 20 with respect to a signal received by position sensors 16. One has to realize, that a certain time will pass, before a certain area of the conveyor belt will move from a position neighbouring the contact tips 17 to a position neighbouring the cutting edge 13 of casting blade 9. The delay time to be chosen depends on the speed of the conveyor belt 3 $v$ and the distance d between the contact tips 17 and the cutting edge 13 of the casting blade 9. Preferably the delay time should be chosen to be $\Delta t = d/v$.

Using this embodiment, it is possible to account for any locally confined variations of the outer circumferential surface of conveyor belt 3. This way, a sheet 2 of alkaloids containing material with an even more homogenous thickness can be realized.

It is to be noted that is even possible to interchange the arrangement of the casting blade 9 and the position sensors 16, so that the position sensors 16 are arranged behind the casting blade 9 with respect to the moving direction 8 of the conveyor belt 3. Then, the time delay Δt has to be chosen quite large, since the time delay is now based on the difference of the overall length of the conveyor belt 3 D (length that will be passed before a certain piece of the conveyor belt will show up again at a certain position) and the distance d between the contact tips 17 and the cutting edge 13 of the casting blade 9. Therefore, the delay time will be Δt=(D−d)/υ.

It is to be noted that the embodiments shown are presently given for illustrative purposes and are not meant to be limiting the scope of the invention in any case.

In particular, it is also possible to combine certain features of the certain embodiments given in a way that is obvious to a person skilled in the art.

The invention claimed is:

1. Method to cast a sheet of a material containing alkaloids, the method comprising:
   Providing a container having an aperture;
   providing a casting blade;
   Providing a movable support running below the aperture of the container;
   Filling the container with slurry;
   Casting the sheet of tobacco material containing alkaloids material by means of the casting blade onto the movable support;
   Sensing variations in a height of the movable support, wherein sensing variations in the height of the movable support includes positioning a sensing surface in contact to the movable support; and
   Changing a height of the casting blade based on the sensed variations in the height of the movable support.

2. The method according to claim 1, including:
   Selecting a height of the casting blade with respect to a reference plane;
   Selecting a height of a portion of the movable support located below the casting blade with respect to the reference plane.

3. The method according to claim 1, wherein the casting blade includes a tip and wherein the method further comprises sensing the height of the casting blade and includes changing a height of the tip of the casting blade.

4. The method according to claim 1, including positioning two sensing surfaces on the movable support at two opposite lateral sides of the cast sheet.

5. The method according to claim 1, including:
   Translating the movable support below the aperture by means of a roller;
   Positioning the container on a top portion of the roller.

6. The method according to claim 5, wherein providing the casting blade adjacent to the container includes providing the casting blade with a tip forming an angle comprised between about 5° and about 10° with a top most point of the roller.

7. The method according to claim 1, wherein changing the height of the tip of the casting blade includes:
   Sending signals relative to variations in height of the movable support to a motor;
   Raising or lowering the tip of the casting blade by means of the motor according to the received signals.

8. The method according to claim 1, including:
   Delaying the step of changing the height of the tip of the casting blade with respect to the step of sensing variations in height of the movable support.

9. The method according to claim 1, wherein positioning a sensing support surface in contact to the movable support includes positioning a sensing support surface downstream the casting blade in the direction of motion of the movable support.

10. The method according to claim 9, wherein positioning a sensing support downstream the casting blade includes positioning the sensing support surface at an angle comprised between about 15° and about 30° with a top most point of the roller.

11. The method according to claim 1, including:
   Exerting a force by the sensing surface onto the movable support.

12. The method according to claim 11, including:
   Varying the value of the force depending on the desired sensitivity.

13. The method according to claim 1, including:
   Drying the cast sheet.

14. The method according to claim 1, including:
   Rolling the cast sheet into a bobbin.

* * * * *